(12) United States Patent
Zheng et al.

(10) Patent No.: US 11,409,672 B2
(45) Date of Patent: **\*Aug. 9, 2022**

(54) UNSUCCESSFUL WRITE RETRY BUFFER

(71) Applicant: Rambus Inc., Sunnyvale, CA (US)

(72) Inventors: Hongzhong Zheng, Sunnyvale, CA (US); Brent Haukness, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/872,681

(22) Filed: May 12, 2020

(65) Prior Publication Data

US 2020/0334009 A1  Oct. 22, 2020

Related U.S. Application Data

(63) Continuation of application No. 15/619,361, filed on Jun. 9, 2017, now Pat. No. 10,684,823, which is a continuation of application No. 14/327,740, filed on Jul. 10, 2014, now Pat. No. 9,710,226.

(60) Provisional application No. 61/846,938, filed on Jul. 16, 2013.

(51) Int. Cl.
*G06F 13/00* (2006.01)
*G06F 13/16* (2006.01)
*G06F 5/14* (2006.01)

(52) U.S. Cl.
CPC ............ *G06F 13/1626* (2013.01); *G06F 5/14* (2013.01)

(58) Field of Classification Search
CPC .................................................. G06F 13/1626
See application file for complete search history.

(56) References Cited

U.S. PATENT DOCUMENTS

| 6,640,292 | B1 | 10/2003 | Barth et al. |
| 6,889,300 | B2 | 5/2005 | Davis et al. |
| 8,397,024 | B2 | 3/2013 | Fasoli et al. |
| 2002/0078302 | A1* | 6/2002 | Favor ................. G06F 12/0857 711/133 |
| 2003/0191916 | A1* | 10/2003 | McBrearty .......... G06F 11/1464 711/162 |
| 2009/0187700 | A1 | 7/2009 | Kern et al. |
| 2011/0110172 | A1 | 5/2011 | Lee et al. |
| 2011/0283050 | A1 | 11/2011 | Pasquale et al. |

\* cited by examiner

*Primary Examiner* — Jae U Yu
(74) *Attorney, Agent, or Firm* — The Neudeck Law Firm, LLC

(57) ABSTRACT

A memory module includes at least two memory devices. Each of the memory devices perform verify operations after attempted writes to their respective memory cores. When a write is unsuccessful, each memory device stores information about the unsuccessful write in an internal write retry buffer. The write operations may have only been unsuccessful for one memory device and not any other memory devices on the memory module. When the memory module is instructed, both memory devices on the memory module can retry the unsuccessful memory write operations concurrently. Both devices can retry these write operations concurrently even though the unsuccessful memory write operations were to different addresses.

13 Claims, 16 Drawing Sheets

_US 11,409,672 B2_

UNSUCCESSFUL WRITE RETRY BUFFER

DETAILED DESCRIPTION OF THE EMBODIMENTS

Figure 1:
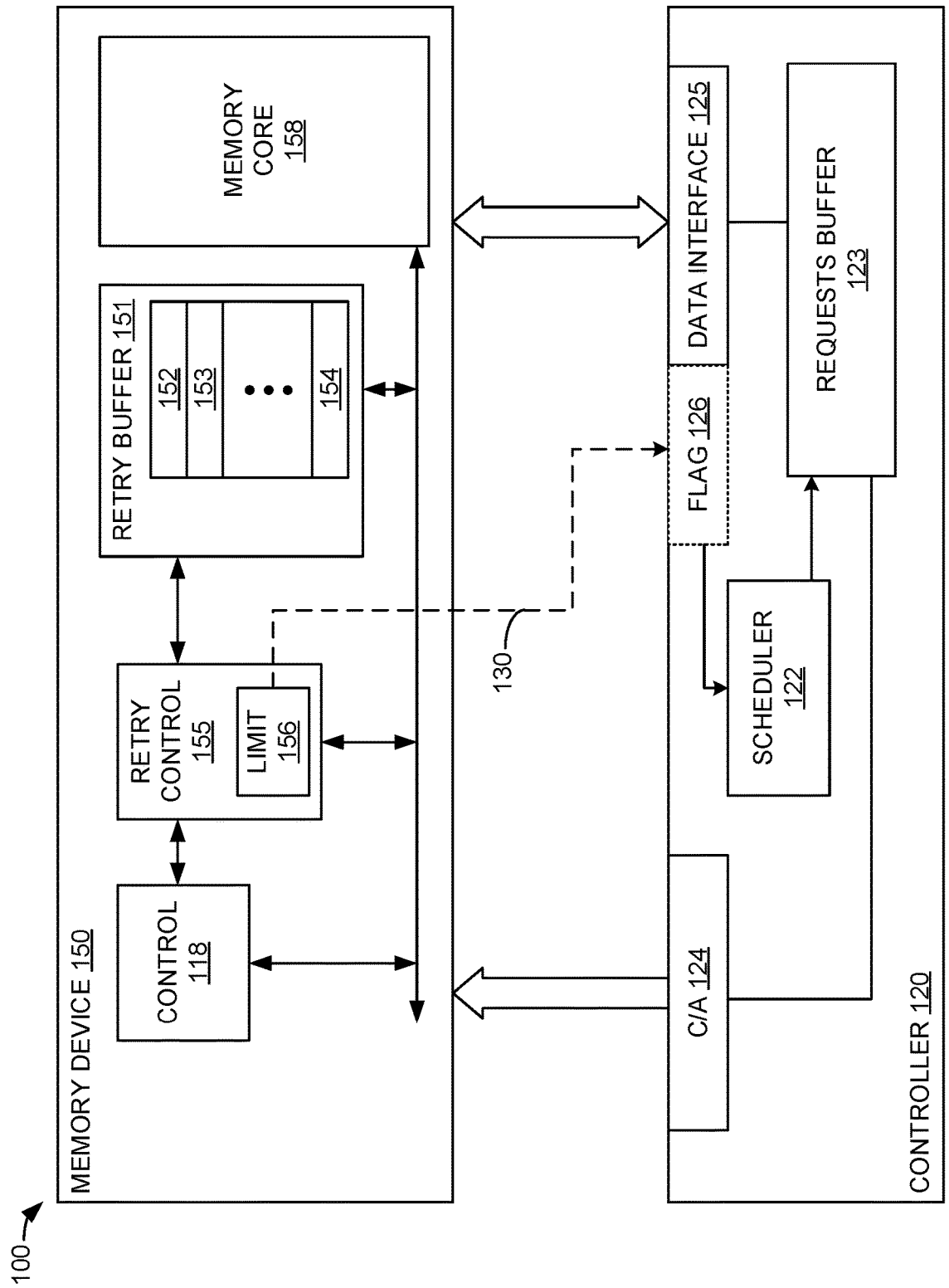
FIG. 1 is a block diagram illustrating a memory system.

FIG. 1 is a block diagram illustrating a memory system with a controller and a memory device in accordance with an embodiment. In FIG. 1, memory system 100 includes controller 120 and memory device 150. Controller 120 and memory device 150 are integrated circuit type devices, such as are commonly referred to as a "chips". A memory controller, such as controller 120, manages the flow of data going to and from memory devices. A memory controller can be a separate, standalone chip, or integrated into another chip. For example, a memory controller may be included on a single die with a microprocessor, or included as part of a more complex integrated circuit system such as a block of a system on a chip (SOC).

Memory device 150 includes control 118, retry buffer 151, retry control 155 and memory core 158. Retry buffer 151 includes a plurality of entries 152-154. Retry control 156 includes limit indicator 156. Controller 120 includes scheduler 122, requests buffer 123, command/address (C/A) interface 124, data interface 125, and flag interface 126.

Control 118, retry control 155, and retry buffer 151 are operatively coupled to memory core 158. Control 118 is operatively coupled to retry control 155. Retry control 155 is operatively coupled to retry buffer 151. C/A interface 124 is operatively coupled to memory device 150 to send commands and addresses to memory device 150. Data interface 125 is operatively coupled to memory device 150 to send and receive data to/from memory device 150.

Requests buffer 123 is operatively coupled to C/A interface 124, data interface 125, and scheduler 122. Requests buffer 123 is operatively coupled to C/A interface 124, data interface 125, and scheduler 122 so that controller 120 may operate and control memory device 150.

Flag interface 126 is operatively coupled to memory device 150, and limit indicator 156 in particular. Flag interface 126 may be included in data interface 125 or may be a separate interface. Flag interface 126 receives limit indicator 156. This is illustrated in FIG. 1 by connection 130. Flag interface 126 sends limit indicator 156 to scheduler 122. Scheduler 122 can use limit indicator 156 to schedule commands into requests buffer 123.

In an embodiment, memory core 158 comprises a memory technology that experiences cell-to-cell and write-to-write variations in the amount of time it takes to write (i.e. program) a cell. Examples of memory technologies with variable write/program time include, but are not limited to, conductive bridging random access memory (CBRAM—a.k.a., programmable metallization cell—PMC), resistive random access memory (a.k.a., RRAM or ReRAM), and magnetoresistive random-access memory (MRAM). These variations in write times can have a statistical distribution whereby only a small percentage of writes take longer than a selected programming time.

Memory device 150 can be operated such that writes to memory core 158 are not guaranteed to have enough time to be successful every time. In other words, memory device 150 is operated such that some percentage of writes to memory core 158 will be unsuccessful (i.e., the write will fail). In order to prevent the loss of data when a write fails, memory device 150 (and control 118, in particular) performs a verify operation after each write to determine whether the write to memory core 158 was successful. When a write to memory core 158 is unsuccessful, memory device 150 stores the write information (e.g., write address and write data) associated with the failed write in entry 152-154 in retry buffer 151. Subsequent reads to the same location as the failed write can be serviced from the entry 152-154 in the retry buffer 151. Reads to the location of the failed write can be serviced by the information stored in retry buffer 151 until such time as retry control 155 successfully retries the failed write and the data associated with the failed write is successfully stored in memory core 158.

In an embodiment, memory device 150 may have a retry buffer 151 for each memory array (i.e., bank) of memory core 158. Memory device 150 may retry writes to multiple banks of memory core 158 concurrently.

As memory device 150 experiences unsuccessful writes, and populates entries 152-154 with unsuccessful write information, retry buffer 151 may become full or nearly full. In other words, over time, entries 152-154 may each become occupied with unsuccessful write information for writes that have yet to be successfully completed. Retry control 155 can monitor how many entries 152-154 in retry buffer 151 are in use. When the number of occupied (or unoccupied) entries 152-154 in retry buffer 151 reaches a threshold number (e.g., no unused entries left), retry control 155 can alert controller 120 using limit indicator 156. For example, memory device 150 may provide an external signal to controller 120 that alerts memory controller that limit indicator 156 is indicating retry buffer 151 is full (or almost full). In another example, controller 120 may read an internal register of memory device 150 that indicates a state of limit indicator 156.

When controller 120 receives a state of limit indicator 156 (via flag interface 126 and/or data interface 125), scheduler 122 inserts (i.e., schedules) an entry into requests buffer 123. The entry scheduled into requests buffer 123 corresponds to a retry command that will cause memory device 150 to retry one or more unsuccessful writes that are stored in retry buffer 151. Controller 120 may also block further write operations from being issued to memory device 150. It should be understood that even when retry buffer 151 is full, controller 120 may continue to issue read commands to memory device 150. When requests buffer 123 issues the retry command, controller 120 causes memory device 150 to retry at least one write operation stored in retry buffer 151. When a retried write operation is successful, retry control 155 can free the corresponding entry 152-154 in retry buffer 151. When a retried write operation is successful, and retry control has freed (e.g., marked as unused) the corresponding entry 152-154 in retry buffer 151, retry control 155 can update limit indicator 156 to reflect the availability of at least one more entry 152-154.

In an embodiment, memory device 150 receives a write command and data from controller 120. In response, memory device 150 attempts to write the data to memory core 158, and then performs a verify operation to determine whether the write operation was successful. If the verify operation determines that the attempted write failed, memory device 150 stores an entry 152-154 in retry buffer 151 that corresponds to the failed write command. This entry 152-154 can contain all the information necessary (e.g., bank address, row, column, data, etc.) to retry the failed write. The entry 152-154 may also be used to respond to reads of the address corresponding to the failed write.

When an entry 152-154 is stored in retry buffer 151 in response to a failed write, retry control 155 updates limit indicator 156, if necessary. The updated limit indicator 156 may be sent to controller 120. The updated limit indicator 156 may cause controller 120 to schedule a retry command to be sent to memory device 150. In response to the scheduling of a retry command, controller 120 may control memory device 150 to retry one or more failed writes using information stored in the entries 152-154 of retry buffer 151. When one or more of the retried writes succeeds, thereby freeing an entry 152-154 in retry buffer 151, retry control updates limit indicator 156.

Figure 2:
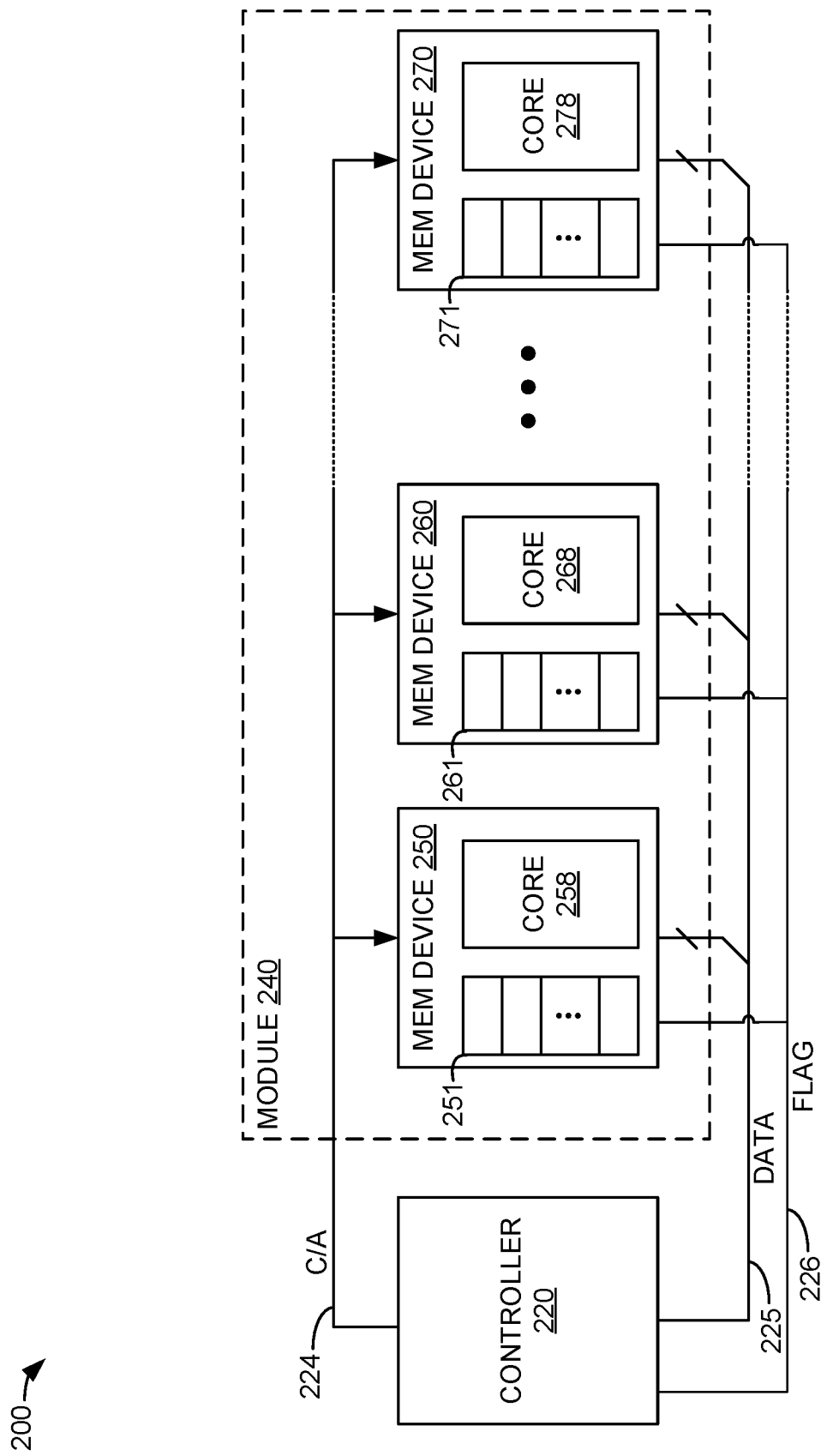
FIG. 2 is a block diagram illustrating a memory module system.

FIG. 2 is a block diagram illustrating a memory module system. In FIG. 2, memory system 200 includes controller 220 and module 240. Module 240 includes memory device 250, memory device 260, and memory device 270. Memory device 250 includes retry buffer 251 and core 258. Memory device 260 includes retry buffer 261 and core 268. Memory device 270 includes retry buffer 271 and core 278.

It should be understood that controller 220 may be or include controller 120 illustrated in FIG. 1. Likewise, it should be understood that memory devices 250, 260, and 270 may be or correspond to memory device 150 illustrated in FIG. 1. It should also be understood that while memory system 200 is illustrated with one module 240 having three memory devices, additional memory devices may be included in module 240 and/or additional modules may be included in memory system 200.

In FIG. 2, controller 220 is operatively coupled to memory device 250, memory device 260, and memory device 270 of module 240 by command/address (C/A) bus 224. Controller 220 is also coupled to memory device 250, memory device 260, and memory device 270 of module 240 by data bus 225 and flag 226. Flag 226 may comprise one or more signals. Flag 226 may comprise one signal that has been logically combined (e.g., in a wired-or configuration) from an output from each of memory devices 250, 260 and 270. Flag may represent one or more signals that are read from internal registers and sent to controller 220 via data bus 225.

Data bus 225 can be distributed across memory devices 240. In other words, each of memory devices 250, 260, and 270 may each be coupled to different subsets of the signals of data bus 225 which, when aggregated, form the entire width of data bus 225. For example, each of memory devices 250, 260, and 270 may each be coupled to different sets of eight (8) signals of data bus 225. Thus, each of memory devices 250, 260, and 270 each read and write one byte (8 bits) at a time. However, since each of memory devices 250, 260, and 270 perform their operations in parallel, controller 220 read/writes from/to module 240 at the full width of data bus 225. For example, if there are a total of 8 memory devices on module 240, and each memory device is coupled to data bus 225 using 8 signal lines, then controller 220 can read/write to module 240 64 bits at a time.

In an embodiment, memory cores 258, 268, and 278 comprise a memory technology that experiences cell-to-cell and write-to-write variations in the amount of time it takes to write a cell. These variations in write times can have a statistical distribution whereby only a small percentage of writes take longer than a selected programming time. These variations in write times are also uncorrelated (or poorly correlated) between memory devices. In other words, when a write is made to module 240 (and thus to each of memory devices 250, 260, and 270, in parallel), the likelihood that this write will fail in memory device 250 is independent of the likelihood that the same write will fail in another memory device 260 or 270.

Module 240 (and thus each of memory devices 250, 260, and 270) can be operated such that writes to each of memory cores 258, 268, and 278 are each not guaranteed to have enough time to be successful every time. In other words, memory devices 250, 260, and 270 are operated such that some percentage of writes to their respective memory cores 258, 268, and 278 will be unsuccessful (i.e., the write will fail). In order to prevent the loss of data when a write to a particular memory device 250, 260, and/or 270 fails, each of memory devices 250, 260, and 270 perform a verify operation after each write to determine whether the write was successful. When a write to a memory core 258, 268, and/or 278 is unsuccessful, the respective memory device 250, 260, and/or 270 stores the write information associated with the failed write in a respective retry buffer 251, 261, and/or 271.

An unsuccessful write can occur in memory device 250 while the same write operation is successful for memory device 260 and memory device 270. Likewise, an unsuccessful write can occur in memory device 260 while the same write operation is successful for memory device 250 and memory device 270, and so on. Thus, the entries in retry buffers 251, 261, and 271 can be filled at different rates and at different times.

Because the entries of retry buffers 251, 261, and 271 fill at different rates and at different times, one or more of retry buffers 251, 261, and 271 can become full (or almost full) independent of the other retry buffers 251, 261, and 271. The retry buffer that meets a threshold criteria of occupied (or lack of unoccupied) entries, provides an external signal to controller 220 (e.g., flag 226). This external signal alerts memory controller 220 that one or more of retry buffers 251, 261, and 271 is full (or almost full). In an embodiment, controller 220 may read internal registers of memory devices 250, 260, and 270 that indicate a state of a limit indicator, such as flag 226.

When controller 220 receives the indication that a retry buffer 251, 261, or 271 is full (or almost full), controller 220 can schedule a command that will cause memory device 250, 260, and 270 to each retry an unsuccessful write. Controller 220 may also block further writes operations from being issued to module 240. It should be understood that even when one or more of retry buffers 251, 261, and 271 is full, controller 220 may continue to issue read commands to module 240. When controller 220 issues the retry command, each of memory devices 250, 260, and 270, can, if they have an write stored in their respective retry buffer that needs retrying, retry at least one write operation. When a retried write operation is successful, each of memory devices 250, 260, and 270, can free a corresponding entry in their respective retry buffers 251, 261, and 271. When a retried write operation is successful, the memory device 250, 260, and/or 270 that asserted the external signal can update flag 226 to reflect the availability of at least one entry in its retry buffer 251, 261, or 271.

From the foregoing, it should be understood that since the entries of retry buffers 251, 261, and 271 were filled at different rates and at different times, a retry command to module 240 has the effect of retrying multiple writes on memory device 250, 260, and 270 even though those writes failed at different times and on different devices. This aggregation of write retries is further illustrated with reference to FIGS. 3A-3E.

Figure 3A:
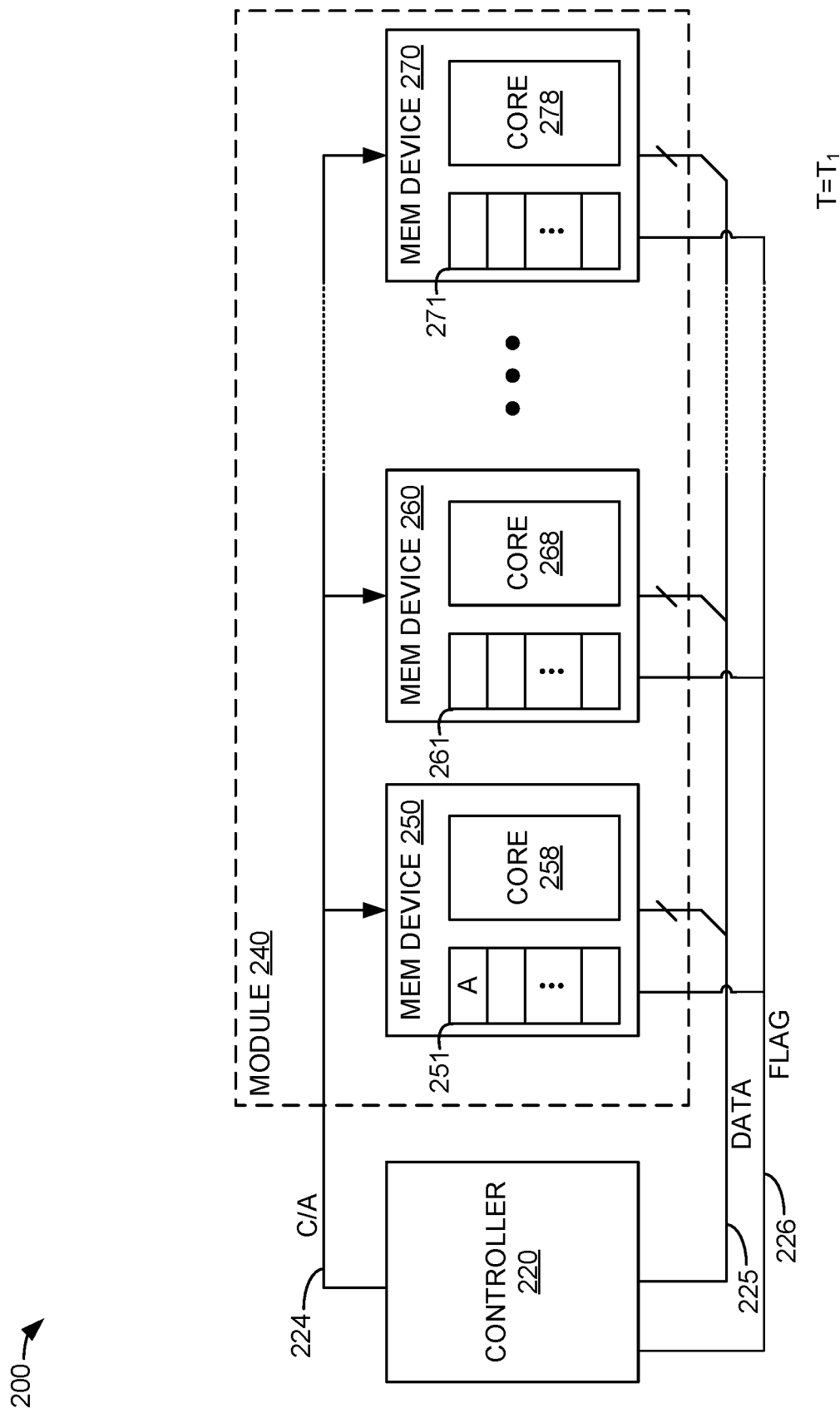
FIGS. 3A-3E illustrate an example of the operation of a memory module system.

FIGS. 3A-3E illustrate an example of the operation of a memory module system. FIG. 3A-3E illustrate the operation of memory system 200 at example points in time. In FIG. 3A, the state of memory system 200 is shown at a first time, $T_1$. At $T_1$ memory device 250 has experienced an single unsuccessful write. An entry "A" is illustrated in retry buffer 251 corresponding to this unsuccessful write. Memory devices 260 and 270 have not experienced any unsuccessful writes so retry buffers 261 and 271 are illustrated as empty.

Figure 3B:
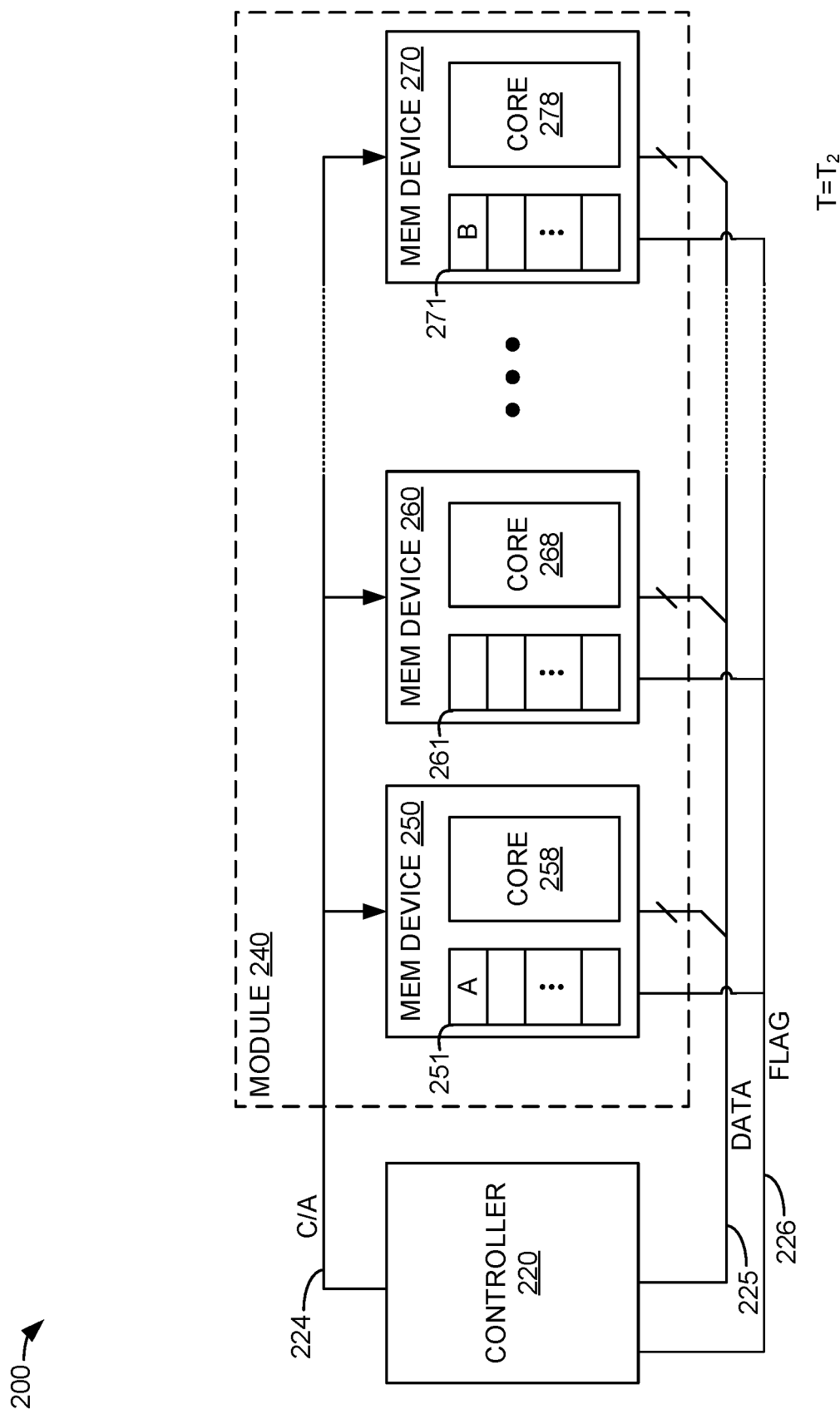

In FIG. 3B, the state of memory system 200 is shown at a second time, $T_2$. Between time $T_1$ and $T_2$, memory device 270 has experienced a single unsuccessful write. An entry "B" is illustrated in retry buffer 271 corresponding to this unsuccessful write. Memory device 260 has not experience any unsuccessful writes so retry buffer 261 is illustrated as empty.

Figure 3C:
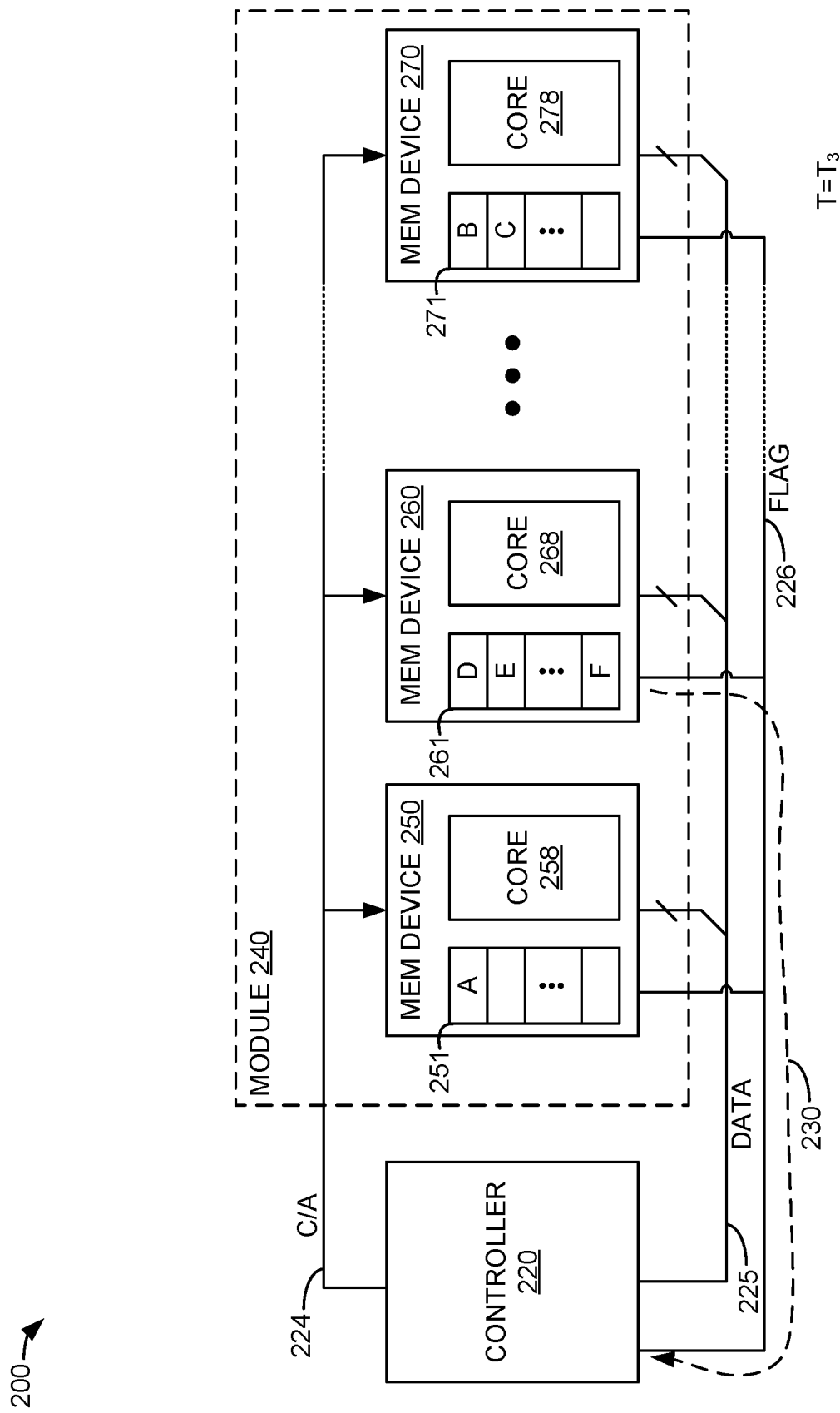

In FIG. 3C, the state of memory system 200 is shown at a third time, $T_3$. Between time $T_2$ and $T_3$, memory device 270 has experienced at least one more unsuccessful write. An entry "C" is illustrated in retry buffer 271 corresponding to this unsuccessful write. Between time $T_2$ and $T_3$, memory device 260 has experienced enough unsuccessful writes to fill retry buffer 261. Entries "D", "E", and "F" are illustrated in retry buffer 261 corresponding to these unsuccessful writes. Also illustrated in FIG. 3C is a limit indicator being sent to controller 220. The sending of the limit indicator is illustrated in FIG. 3C by arrow 230.

Figure 3D:
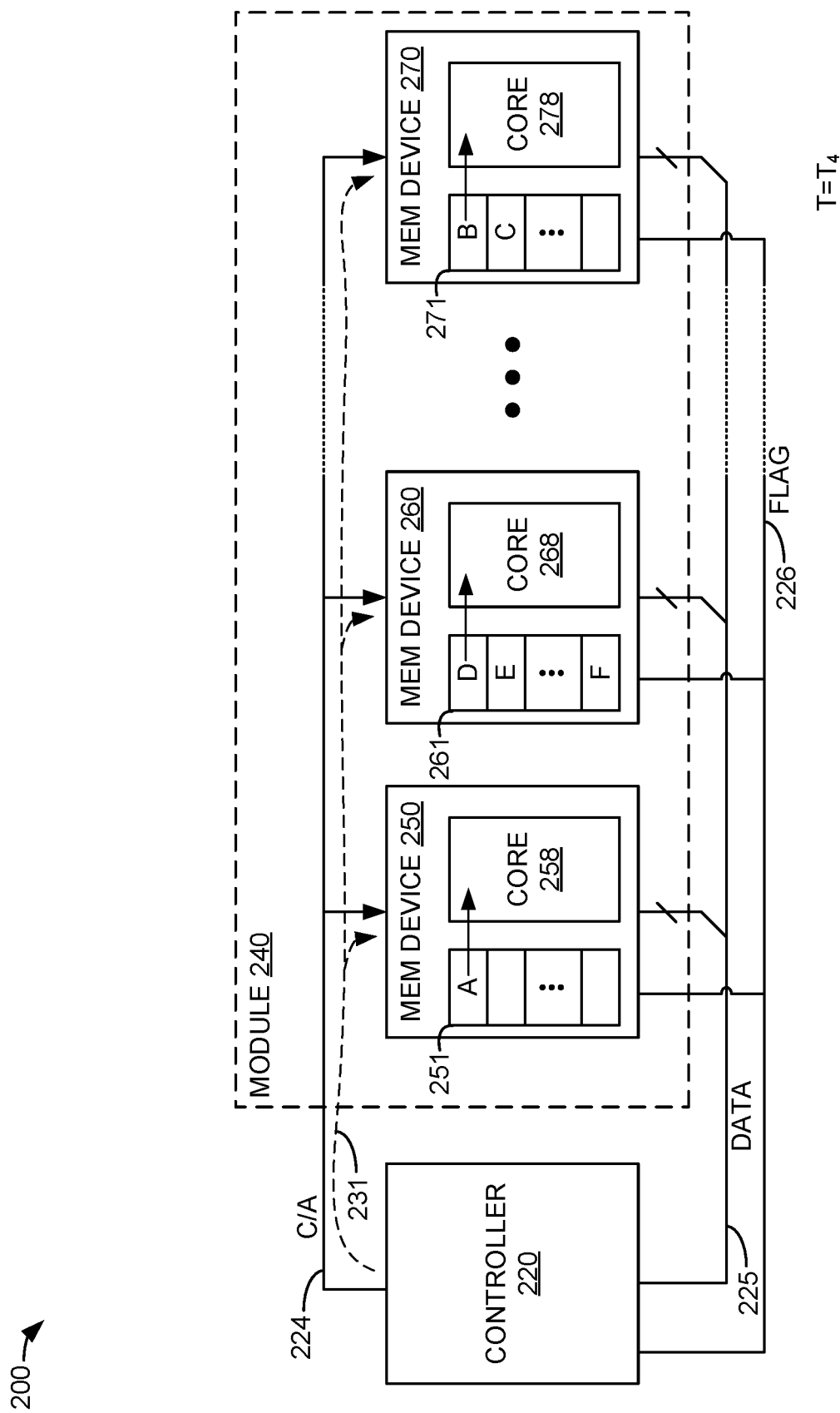

In FIG. 3D, the state of memory system 200 is shown at a fourth time, $T_4$. At $T_4$, in response to the limit indicator, controller 220 has sent a command that causes (or allows) memory devices 250, 260, and 270 to retry at least one write that is stored in their respective retry buffers 251, 261, and 271. This command is illustrated in FIG. 3D by arrow 231. In response, memory devices 250, 260, and 270 each retry a write. These writes can all be retried at the same time even though they may be to different addresses and for different data values. This is illustrated in FIG. 3D for memory device 250 by the arrow from entry "A" to core 258, for memory device 260 by the arrow from entry "D" to core 268, and for memory device 270 by the arrow from entry "B" to core 278.

Figure 3E:
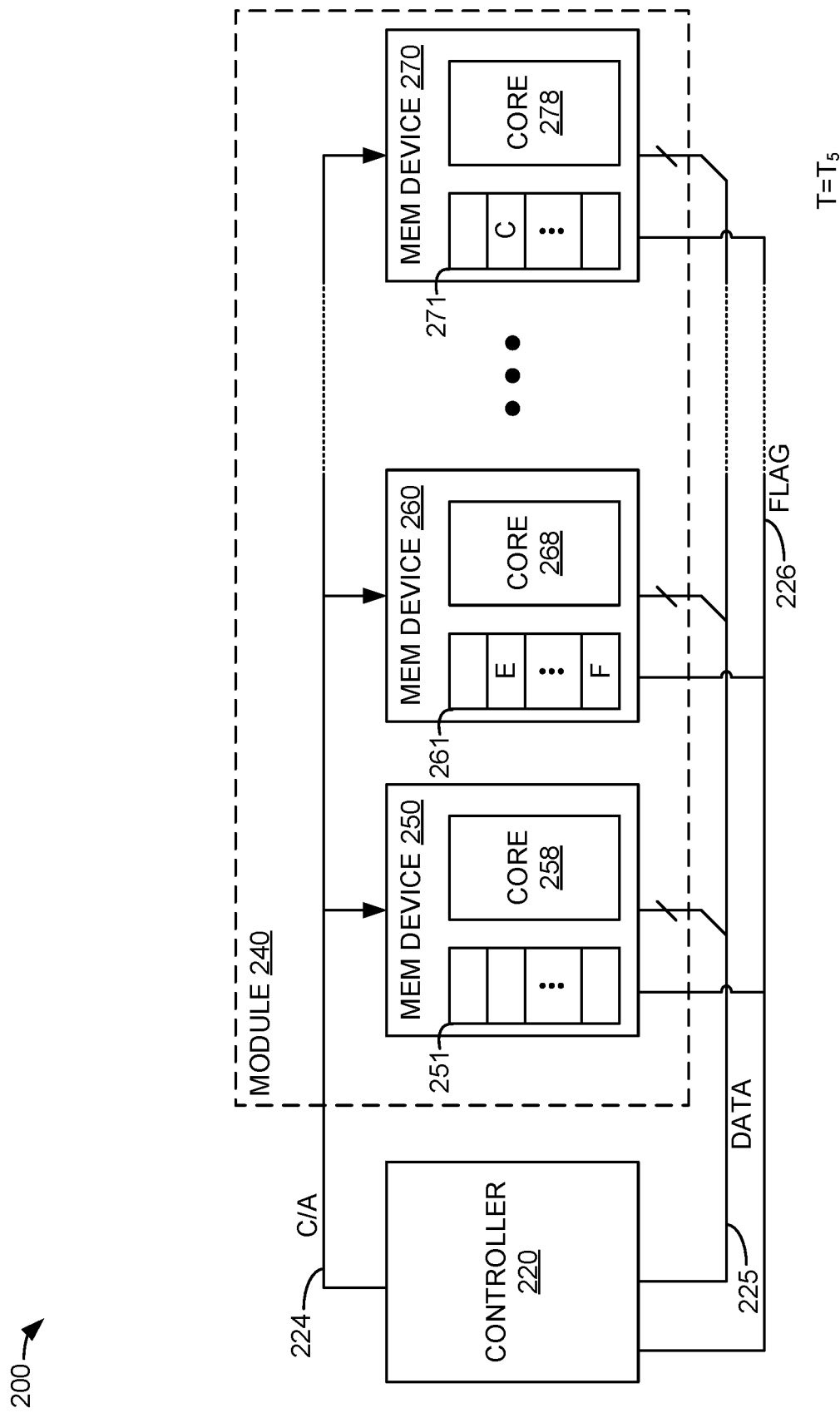

In FIG. 3E, the state of memory system 200 is shown at a fifth time, $T_5$. At $T_5$, memory devices 250, 260, and 270 have successfully completed the retries of writes "A", "D", and "B", respectively. This is illustrated in FIG. 3E by top entries in retry buffers 251, 261, and 271, respectively, which are shown as empty.

Figure 4:
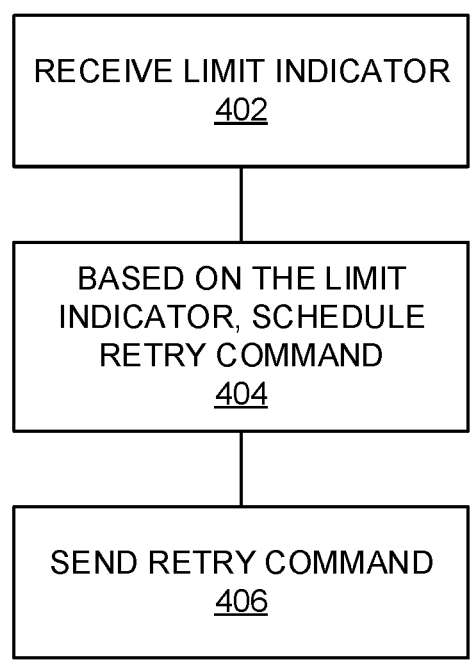
FIG. 4 is a flowchart illustrating a method of operating a memory controller.

FIG. 4 is a flowchart illustrating a method of operating a memory controller. The steps illustrated in FIG. 4 may be performed by one or more elements of memory system 100 and/or memory system 200. A limit indicator is received (402). For example, controller 220 may receive flag 226 from a memory device 250, 260, and/or 270 that has a full or nearly full retry buffer 251, 261, and 271, respectively. In another example, controller 220 may receive a limit indicator from a single memory device 260 that has a full or nearly full retry buffer 261. See, for example, FIG. 3C.

Based on the limit indicator, a retry command is scheduled (404). For example, based on a limit indicator received by controller 220, controller 220 may schedule a retry command to be sent to module 240. In another example, based on a limit indicator, controller 220 may schedule a time to place module 240 in a mode whereby memory devices 250, 260, and 270 can perform retry writes that are stored in retry buffers 251, 261, and 270, respectively. Controller 220 may continue to schedule other commands to be sent to module 240. Controller 220 may schedule other commands to be sent to module 240 between the time controller 220 received the limit indicator and the time the retry command is sent. Controller 220 may schedule other non-write commands to be sent to module 240 between the time controller 220 received the limit indicator and the time the retry command is sent. In other words, controller 220 may block write commands from being sent to module 240 unless and until memory devices 250, 260, or 270 successfully perform at least one write stored in a full retry buffer 251, 261, or 270, respectively.

The retry command is sent (406). For example, controller may send a retry command at its scheduled time. This retry command can enable or cause memory devices 250, 260, and 270 to perform one or more retry writes that are stored in retry buffers 251, 261, and 270, respectively.

Figure 5:
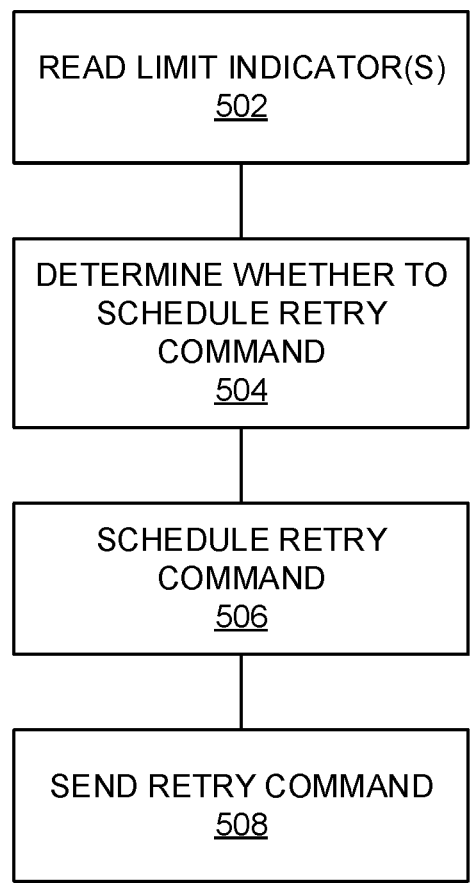
FIG. 5 is a flowchart illustrating a method of operating a memory device.

FIG. 5 is a flowchart illustrating a method of operating a memory device. The steps illustrated in FIG. 5 may be performed by one or more elements of memory system 100 and/or memory system 200. Limit indicators are read (502). For example, controller 220 may read internal registers of memory devices 250, 260, and 270 on module 240 to obtain indicators of the number of empty entries in retry buffers 251, 261, and 271. These indicators may be read by controller 220 via a command sent via C/A bus 224 and with the register data being sent via data bus 225. Controller 220 may periodically read (i.e., poll) the internal registers of memory devices 250, 260, and 270 on module 240 to obtain, over time, the indicators of the number of empty entries in retry buffers 251, 261, and 271.

Whether to schedule a retry command is determined (504). For example, controller 220 may determine, from the indicators of the number of empty entries in retry buffers 251, 261, and 271, whether at least one of retry buffers 251, 261, and 271 is full or nearly full. If at least one of retry buffers 251, 261, and 271 is full or nearly full (i.e., meets a threshold criteria associated with the number of used or unused entries), controller 220 may decide to schedule a retry command.

A retry command is scheduled (506). For example, if controller 220 has determined to schedule a retry command based on the indicators of the number of empty entries in retry buffers 251, 261, and 271, controller 220 may schedule a command to place module 240 in a mode whereby memory devices 250, 260, and 270 can perform retry writes that are stored in retry buffers 251, 261, and 270, respectively. The retry command is sent (508). For example, when the time for the scheduled time for the retry command to be issued arrives, controller 220 may issue the retry command to module 240 via C/A bus 224.

Figure 6:
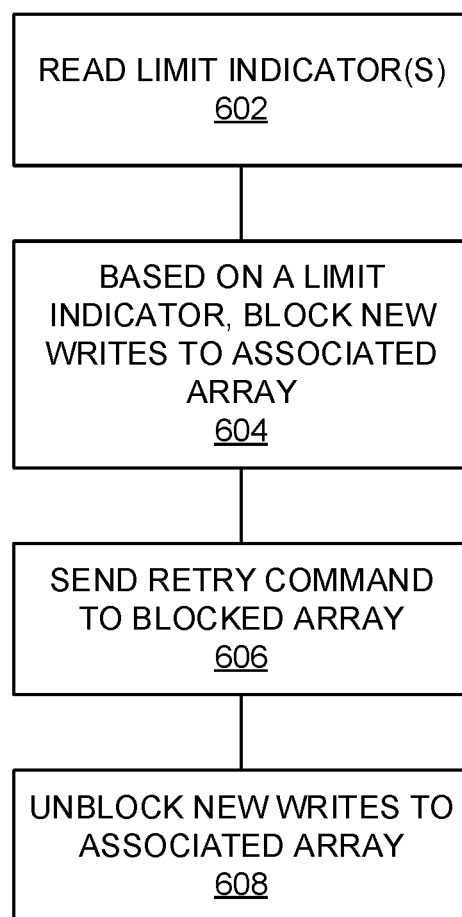
FIG. 6 is a flowchart illustrating a method of operating a memory system.

FIG. 6 is a flowchart illustrating a method of operating a memory system. The steps illustrated in FIG. 6 may be performed by one or more elements of memory system 100 and/or memory system 200. Limit indicator(s) are read (602). For example, controller 110 may read flag interface 126 to obtain the state of limit indicator 156. In another example, controller 220 may read internal registers of memory devices 250, 260, and 270 on module 240 to obtain indicators of the number of empty entries in retry buffers 251, 261, and 271. In an example, these limit indicators may be each associated with an entire memory device 250, 260, 270. In another example, the limit indicators may each be associated with a memory array (i.e., bank) internal to each memory device 250, 260, and 270. In this case, controller 220 reads multiple limit indicators from each memory device 250, 260, and 270.

Based on a limit indicator, new writes to the associated array are blocked (604). For example, controller 220 may determine, based on an indicator associated with a bank in memory device 260, that a retry buffer associated with that bank is full. Based on this determination, controller 220 may block the scheduling of new writes to that bank of all memory devices 250, 260, and 270 on module 240. Writes to other banks of memory devices 250, 260, and 270 on module 240 may be allowed to be scheduled and performed. Likewise, reads from memory devices 250, 260, and 270 on module 240 may be allowed to be scheduled and performed. A retry command is sent to the blocked array (606). For example, a retry command may be sent to memory devices 250, 260, and 270 on module 240 that causes at least one of memory devices 250, 260, and 270 to retry at least one write to the blocked bank. New writes to the associated array are unblocked (608). For example, after a write is successfully retried by a memory device 250, 260, or 270 that caused writes to be blocked to a bank, controller 220 may unblock writes to that bank.

Figure 7:
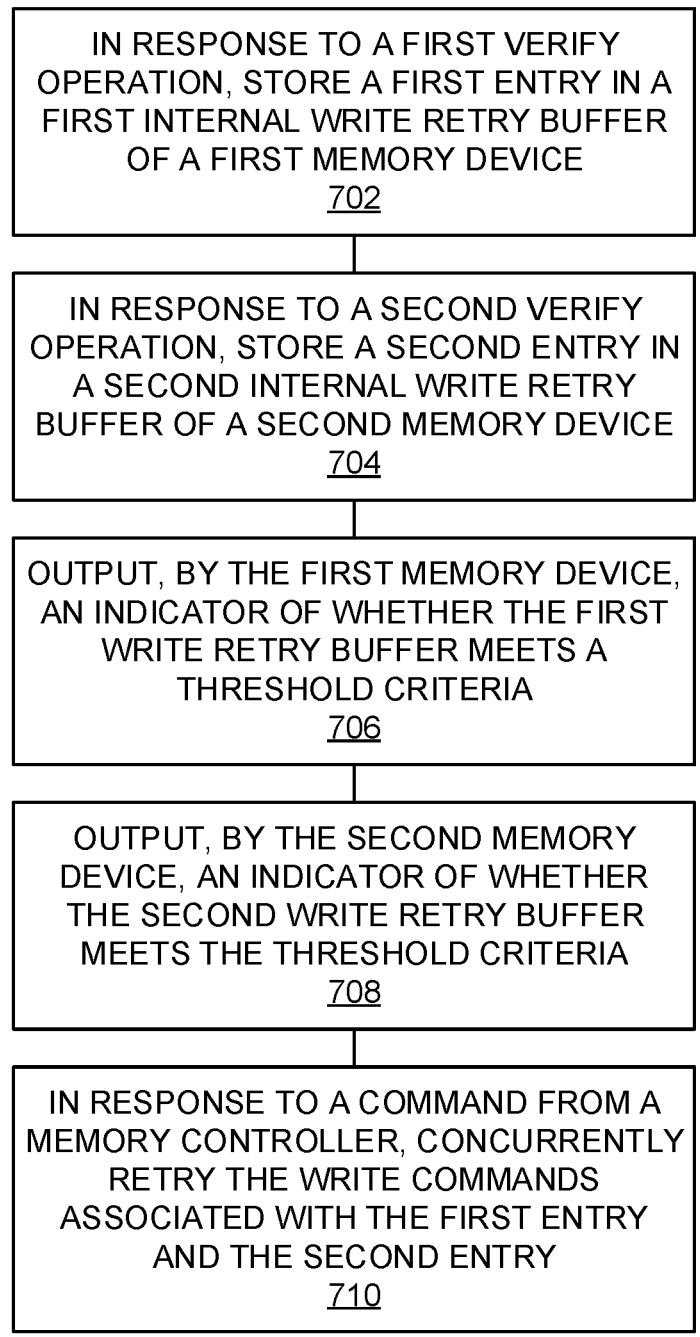
FIG. 7 is a flowchart illustrating a method of operating a memory module.

FIG. 7 is a flowchart illustrating a method of operating a memory module. The steps illustrated in FIG. 7 may be performed by one or more elements of memory system 100 and/or memory system 200. In response to a first verify operation, a first entry is stored in a first internal write retry buffer of a first memory device (702). For example, after a write to module 240 by controller 220, memory device 250 performs a verify operation that determines the write to core 258 was unsuccessful. In response to determining the write to core 258 was unsuccessful, memory device 250 stores an entry associated with the unsuccessful write in retry buffer 251 (e.g., write entry "A" in FIG. 3B). In response to a second verify operation, a second entry is stored in a second internal write retry buffer of a second memory device (704). For example, after another write to module 240 by controller 220, memory device 260 performs a verify operation that determines the write to core 268 was unsuccessful. In response to determining this write to core 268 was unsuccessful, memory device 260 stores an entry associated with the unsuccessful write in retry buffer 261 (e.g., write entry "D" in FIG. 3C).

By the first memory device, an indicator of whether the first write retry buffer meets a threshold criteria is output (706). For example, memory device 250 may output flag 220. In another example, memory device 250 may output an indicator of the number of empty entries in retry buffer 251 in response to a read of internal registers by controller 220. By the second memory device, an indicator of whether the second write retry buffer meets a threshold criteria is output (708). For example, memory device 260 may output flag 220. In another example, memory device 260 may output an indicator of the number of empty entries in retry buffer 261 in response to a read of internal registers by controller 220.

In response to a command from a memory controller, the write commands associated with the first entry and the second entry are retried (710). For example, in response to a command controller 220 sends to module 240, memory device 250 and memory device 260 concurrently each retry a previously unsuccessful write to core 258 and core 268, respectively (e.g., the write associated with entry "A" and the write associated with entry "D" as illustrated in FIG. 3D).

Figure 8:
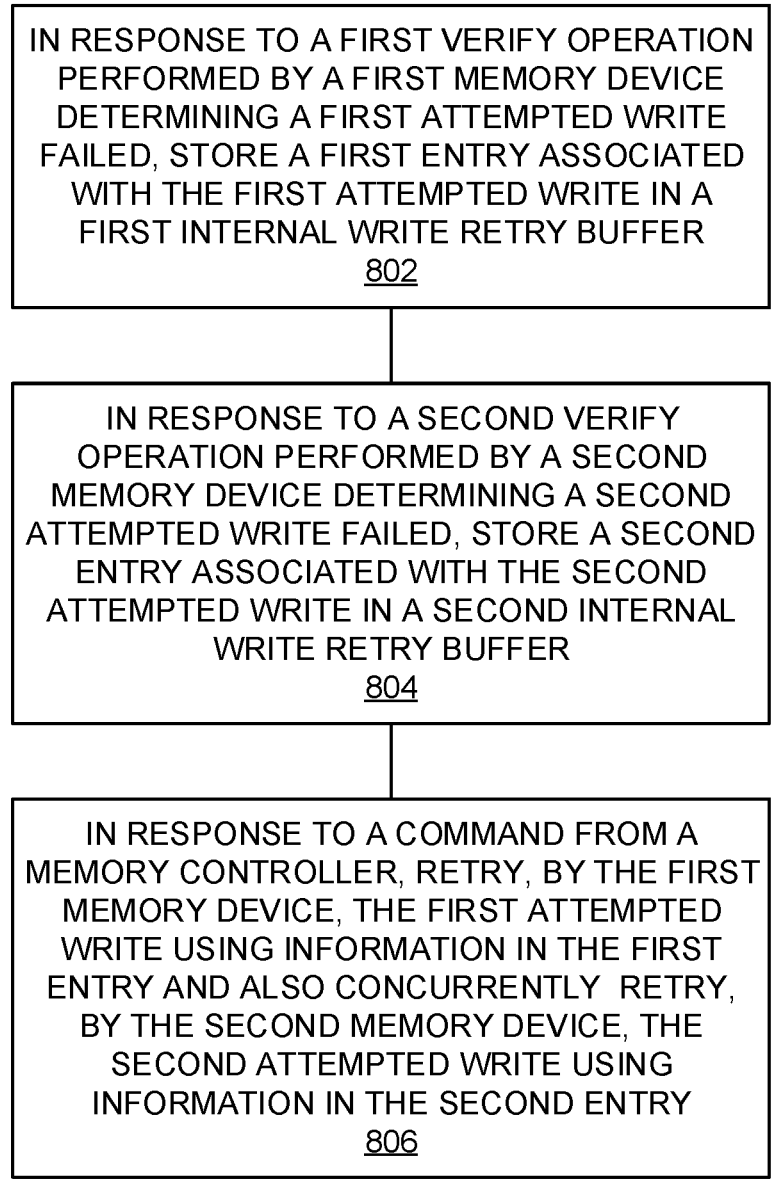
FIG. 8 is a flowchart illustrating a method of operating a memory system.

FIG. 8 is a flowchart illustrating a method of operating a memory system. The steps illustrated in FIG. 8 may be performed by one or more elements of memory system 100 and/or memory system 200. In response to a first verify operation performed by a first memory device determining a first attempted write failed, a first entry associated with the first attempted write is stored in a first internal write retry buffer (802). For example, after a write to module 240 by controller 220, memory device 250 can perform a verify operation that determines the write to core 258 was unsuccessful. In response to determining a write to core 258 was unsuccessful, memory device 250 stores an entry associated with the unsuccessful write in retry buffer 251 (e.g., write entry "A" in FIG. 3B). In response to a second verify operation performed by a second memory device determining a second attempted write failed, a second entry associated with the second attempted write is stored in a second internal write retry buffer (802). For example, after a later write to module 240 by controller 220, memory device 260 can perform a verify operation that determines this later write to core 268 was unsuccessful. In response to determining this later write to core 268 was unsuccessful, memory device 260 stores an entry associated with the unsuccessful write in retry buffer 261 (e.g., write entry "D" in FIG. 3C).

In response to a command from a memory controller, the first attempted write is retried by the first memory device using information in the first entry and the second attempted write is concurrently retried by the second memory device using information in the second entry (806). For example, memory device 250 and memory device 260 can concurrently retry the writes associated with entry "A" and entry "D", respectively, using the information in entry "A" and entry "D", respectively. Thus, even though the write associated with entry "A" occurred at a different time than the write associated with entry "D", both of these writes can be retried concurrently in response to a single command from controller 220 to module 240.

Figure 9:
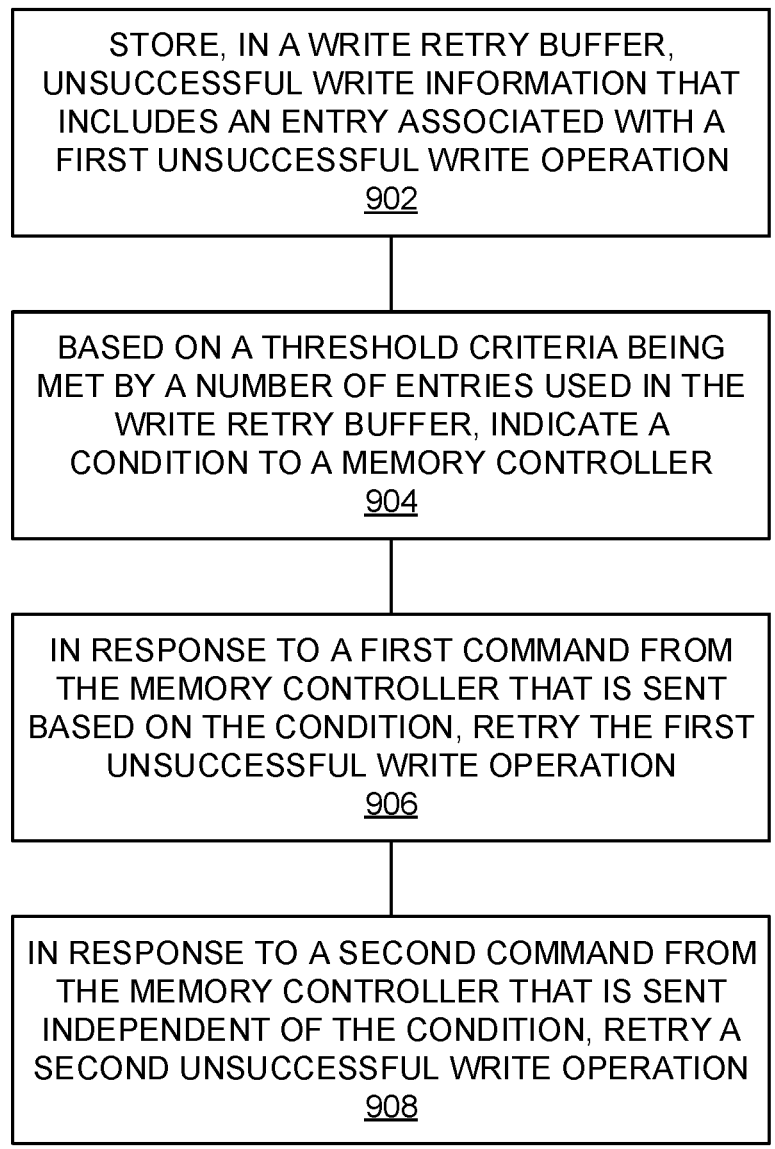
FIG. 9 is a flowchart illustrating a method of operating a memory device.

FIG. 9 is a flowchart illustrating a method of operating a memory device. The steps illustrated in FIG. 9 may be performed by one or more elements of memory system 100 and/or memory system 200. In a write retry buffer, unsuccessful write information that includes an entry associated with a first unsuccessful write operation is stored (902). For example, retry control 155 may store in retry buffer 151 an entry 152 that is associated with a first unsuccessful write operation. Based on a threshold criteria being met by a number of entries used in the write retry buffer, a condition is indicated to a memory controller (904). For example, retry control 155 may determine that retry buffer 151 is full (or nearly full) and indicate this condition to controller 120 via limit indicator 156 and flag interface 126. In another example, one or more of memory devices 250, 260, and/or 270 may determine that their respective retry buffer 251, 261, and/or 271 is full (or nearly full) and indicate this condition to controller 220 via flag 226.

In response to a first command from the memory controller that is sent based on the condition, the first unsuccessful write operation is retried (906). For example, in response to retry buffer 151 being full (or nearly full), controller 120 can send a command to memory device 150 to retry at least the first unsuccessful write operation. Memory device 150 can retry at least one unsuccessful write in response to this command. In another example, in response to at least one of retry buffers 251, 261, and/or 271 being full (or nearly full), controller 220 can send a command to module 240 that causes one or more of memory devices 250, 260, and/or 270 to retry an unsuccessful write operation stored in a respective retry buffer 251, 261, and/or 271.

In response to a first command from the memory controller that is sent independent of the condition, a second unsuccessful write operation is retried (908). For example, controller 120 may periodically command memory device 150 to retry at least one unsuccessful write operation regardless of how many entries in retry buffer 151 are occupied. Memory device 150 may retry at least one unsuccessful write in response to this command. In another example, controller 220 may periodically command module 240 to retry unsuccessful write operations.

Figure 10:
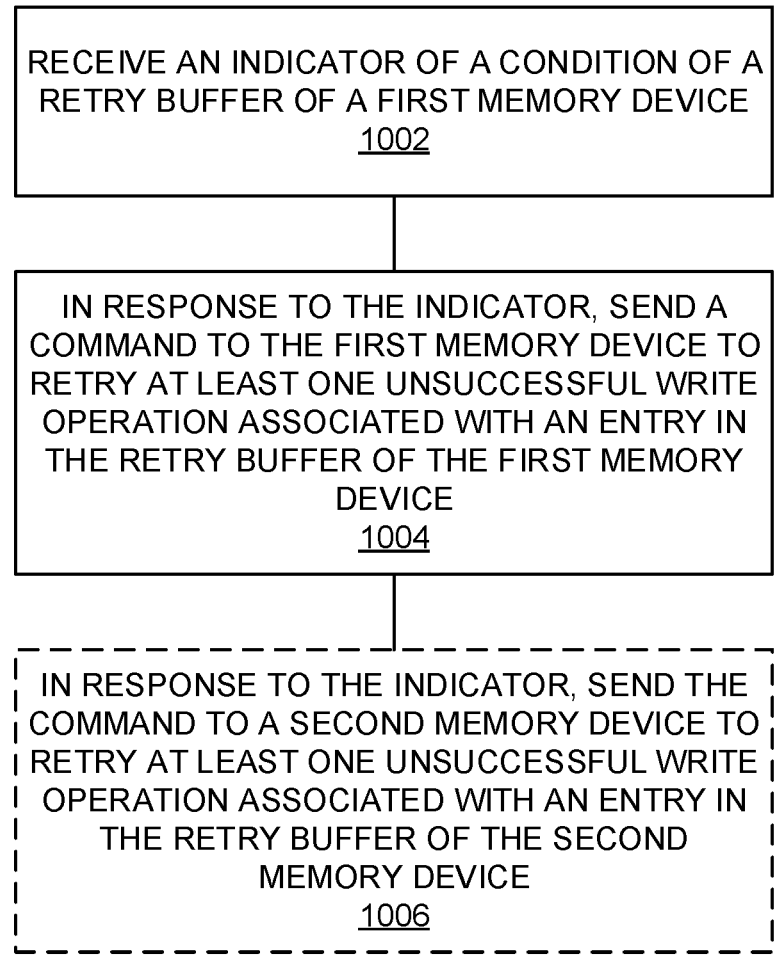
FIG. 10 is a flowchart illustrating a method of operating a memory controller.

FIG. 10 is a flowchart illustrating a method of operating a memory controller. The steps illustrated in FIG. 10 may be performed by one or more elements of memory system 100 and/or memory system 200. An indicator of a condition of a retry buffer of a first memory device is received (1002). For example, controller 120 may receive, via flag interface 126, limit indicator 156. In another example, controller 220 may receive, via flag 226, an indication that retry buffer 261 is full (or nearly full).

In response to the indicator, a command is sent to the first memory device to retry at least one unsuccessful write operation associated with an entry in the retry buffer of the first memory device (1004). For example, in response to indicator 156 received via flag interface 126, controller 120 may send a command to memory device 150 to retry a write operation stored in retry buffer 151. In another example, in response to an indicator received via flag 226, controller 220 may send a command to module 240 that causes at least memory device 260 to retry a write operation stored in retry buffer 261.

Optionally, in response to the indicator, the command is sent to a second memory device to retry at least one unsuccessful write operation associated with an entry in the retry buffer of the second memory device (1006). For example, when controller 220 sends a command to memory device 260 to retry an unsuccessful write (e.g., the write associated with entry "D"), this command may also be sent to memory device 250 causing it to concurrently retry a write operation (e.g., the write associated with entry "A") with the retry performed by memory device 260.

Figure 11:
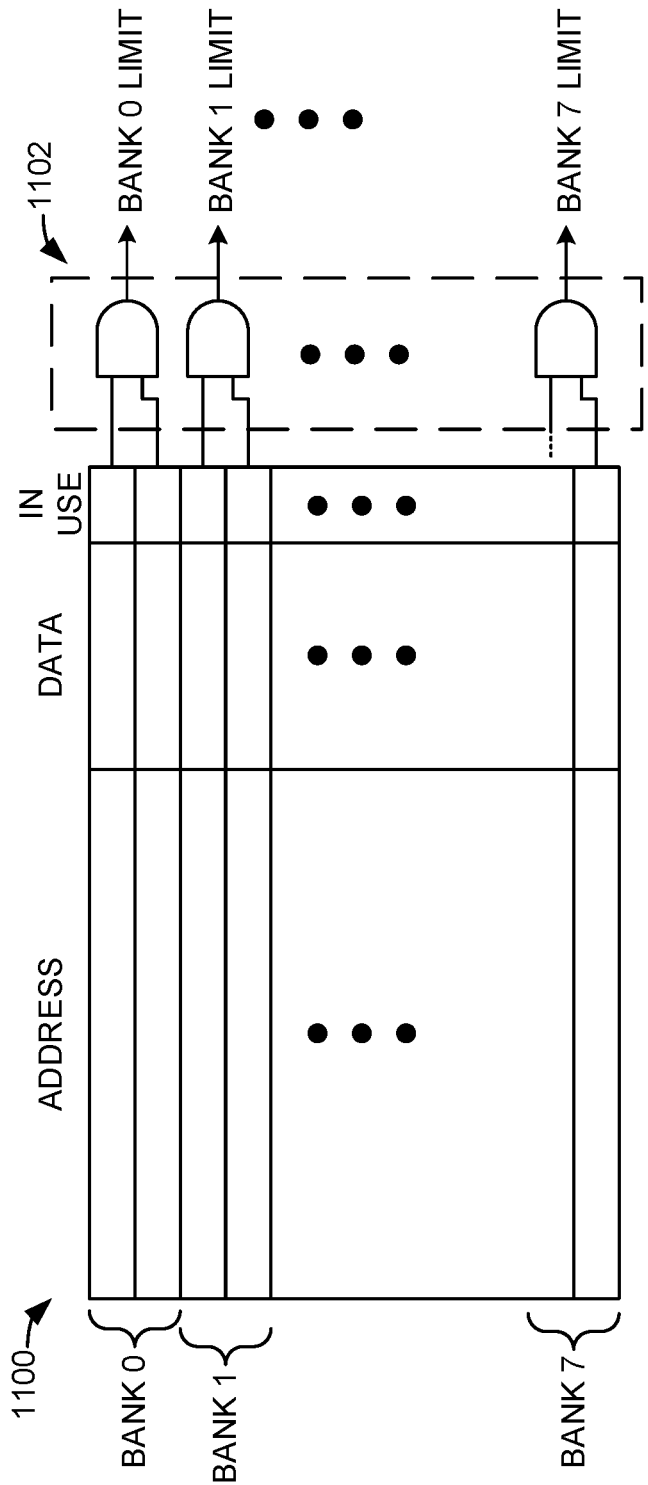
FIG. 11 is a block diagram illustrating an example of per-bank retry buffers.

FIG. 11 is a block diagram illustrating an example of per-bank retry buffers. In FIG. 11, each entry in retry buffer 1100 is illustrated as a row and has three fields: address, data, and an in-use bit. Two entries are allocated to each bank 0-7 for a total of eight banks (sixteen entries total). Thus, there are two in-use bits for each of 8 banks. The write address and data for each unsuccessful write that occurs to a bank is stored in an entry associated with that bank. Likewise, the associated in-use bit for an entry is set for each unsuccessful write. AND gates 1102 are each coupled to the two in-use bits associated with a particular bank. Thus, when both of the in-use bits for a bank are set, the AND gate 1102 associated with that bank will output an indicator (i.e., bank 0 limit, bank 1 limit, etc.) that all of the entries in retry buffer 1100 associated with that bank are used. A controller may use the per-bank limit indicators to determine that no further writes should be scheduled to one or more banks. The per-bank limit indicators can also be used to determine which banks should be scheduled to retry one or more writes stored in retry buffer 1100.

The systems and devices described above may be implemented in computer systems, integrated circuits, or stored by computer systems. The systems described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 200, controller 120, memory device 150, controller 220, module 240, and their components. These software descriptions may be: behavioral, register transfer, logic component, transistor, and layout geometry-level descriptions. Moreover, the software descriptions may be stored on non-transitory storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3-½ inch floppy media, CDs, DVDs, Blu-Ray, and so on.

Figure 12:
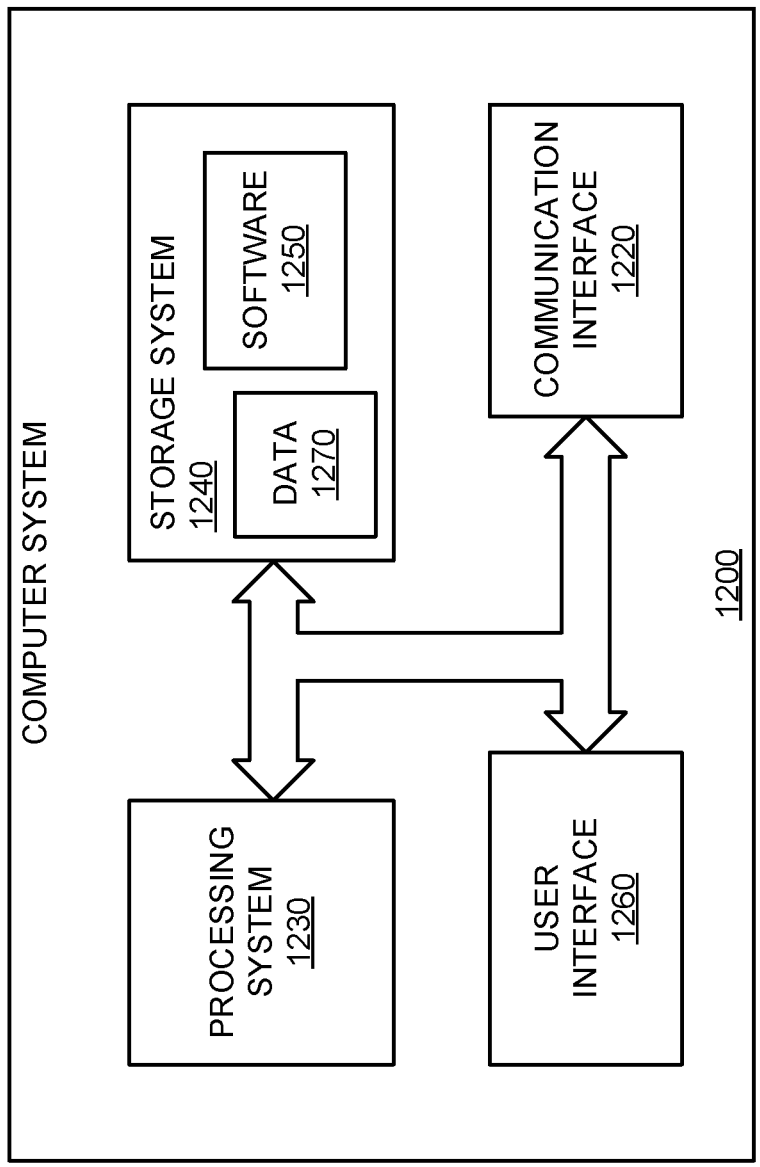
FIG. 12 is a block diagram of a computer system.

FIG. 12 illustrates a block diagram of a computer system. Computer system 1200 includes communication interface 1220, processing system 1230, storage system 1240, and user interface 1260. Processing system 1230 is operatively coupled to storage system 1240. Storage system 1240 stores software 1250 and data 1270. Computer system 1200 may include one or more of system 100, system 200, controller 120, memory device 150, controller 220, module 240, or components that implement the methods, systems, and configurations described herein. Processing system 1230 is operatively coupled to communication interface 1220 and user interface 1260. Computer system 1200 may comprise a programmed general-purpose computer. Computer system 1200 may include a microprocessor. Computer system 1200 may comprise programmable or special purpose circuitry. Computer system 1200 may be distributed among multiple devices, processors, storage, and/or interfaces that together comprise elements 1220-1270.

Communication interface 1220 may comprise a network interface, modem, port, bus, link, transceiver, or other communication device. Communication interface 1220 may be distributed among multiple communication devices. Processing system 1230 may comprise a microprocessor, microcontroller, logic circuit, or other processing device. Processing system 1230 may be distributed among multiple processing devices. User interface 1260 may comprise a keyboard, mouse, voice recognition interface, microphone and speakers, graphical display, touch screen, or other type of user interface device. User interface 1260 may be distributed among multiple interface devices. Storage system 1240 may comprise a disk, tape, integrated circuit, RAM, ROM, EEPROM, flash memory, network storage, server, or other memory function. Storage system 1240 may include computer readable medium. Storage system 1240 may be distributed among multiple memory devices.

Processing system 1230 retrieves and executes software 1250 from storage system 1240. Processing system 1230 may retrieve and store data 1270. Processing system 1230 may also retrieve and store data via communication interface 1220. Processing system 1230 may create or modify software 1250 or data 1270 to achieve a tangible result. Processing system 1230 may control communication interface 1220 or user interface 1260 to achieve a tangible result. Processing system 1230 may retrieve and execute remotely stored software via communication interface 1220.

Software 1250 and remotely stored software may comprise an operating system, utilities, drivers, networking software, and other software typically executed by a computer system. Software 1250 may comprise an application program, applet, firmware, or other form of machine-readable processing instructions typically executed by a computer system. When executed by processing system 1230, software 1250 or remotely stored software may direct computer system 1200 to operate.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of operating a memory controller, comprising:
   receiving an indicator of a condition of a retry buffer of a first memory device, the retry buffer of the first device storing write information associated with verify operations performed by the first memory device that have determined corresponding write operations by the first memory device have failed in a manner that causes loss of data; and,
   in response to the indicator, sending a command to the first memory device to retry at least one unsuccessful write operation associated with an entry in the retry buffer of the first memory device.

2. The method of claim 1, further comprising:
   in response to the indicator, send the command to a second memory device to retry at least one unsuccessful write operation associated with an entry in the retry buffer of the second memory device, the retry buffer of the second device storing write information associated with verify operations performed by the second memory device that have determined corresponding write operations by the second memory device have failed in a manner that causes loss of data.

3. The method of claim 1, further comprising:
   in response to the indicator, stop scheduling write operations to be sent to the first memory device.

4. The method of claim 1, further comprising:
   in response to the indicator, stop scheduling write operations to be sent to a bank of the first memory device.

5. The method of claim 1, wherein in response to the command, the first memory device reads the entry in the retry buffer of the first memory device to retry the at least one unsuccessful write operation.

6. The method of claim 1, wherein in response to a read command, the first memory device reads the entry in the retry buffer of the first memory device to respond to the read command.

7. A memory controller, comprising:
   a first interface to transmit a first command to a first memory device, the first command to cause the first memory device to perform a first verify operation that determines the first command was unsuccessful in a manner that causes loss of data and to store a first entry in a first internal write retry buffer; and
   a scheduler to schedule a second command to the first memory device to cause the first memory device to retry the first command using information stored in the first entry.

8. The memory controller of claim 7, further comprising:
   a second interface to receive an indicator that the first internal write retry buffer meets a threshold criteria associated with a number of used entries in the first internal write retry buffer.

9. The memory controller of claim 8, wherein the scheduler is to schedule the second command based at least in part on the indicator.

10. The memory controller of claim 9, wherein the first command is to be concurrently sent to a second memory device on a module with the first memory device.

11. The memory controller of claim 10 wherein the second memory device comprises a second internal write retry buffer.

12. The memory controller of claim 11, wherein the second interface comprises a flag interface.

13. The memory controller of claim 11, wherein the second interface comprises a data interface.

* * * * *